United States Patent [19]

Ito

[11] Patent Number: 6,108,443
[45] Date of Patent: Aug. 22, 2000

[54] METHOD AND APPARATUS FOR GENERATING A CONVERTED IMAGE WITH REDUCED QUALITY DEGRADATION RESULTING FROM THE CONVERSION

[75] Inventor: Wataru Ito, Kanagawa-ken, Japan

[73] Assignee: Fuji Photo Film Co., Ltd., Kanagawa-Ken, Japan

[21] Appl. No.: 09/134,874

[22] Filed: Aug. 17, 1998

[30] Foreign Application Priority Data

Aug. 25, 1997 [JP] Japan .................................. 9-228161

[51] Int. Cl.[7] .......................................... G06K 9/00
[52] U.S. Cl. .................................. 382/167; 382/274
[58] Field of Search .................................. 382/167, 162, 382/163, 164, 274; 345/153, 154, 155, 199, 510, 431, 150, 152, 186; 358/1.9, 518, 520, 1.1

[56] References Cited

U.S. PATENT DOCUMENTS

| | | | |
|---|---|---|---|
| 5,008,740 | 4/1991 | Phillips et al. | 348/642 |
| 5,272,549 | 12/1993 | McDonald | 358/527 |
| 5,583,665 | 12/1996 | Gregory, Jr. et al. | 358/504 |
| 5,617,116 | 4/1997 | Edgar | 345/150 |
| 5,691,779 | 11/1997 | Yamashita et al. | 348/645 |
| 5,760,916 | 6/1998 | Dellert et al. | 358/408 |
| 5,761,393 | 6/1998 | Enomoto | 358/1.9 |
| 5,828,383 | 10/1998 | May et al. | 345/507 |
| 5,850,481 | 12/1998 | Rhoads | 382/232 |
| 5,852,673 | 11/1998 | Young | 382/164 |

*Primary Examiner*—Dov Popovici

[57] ABSTRACT

A digital input output service provides a customer with an image read from a film in the form of an image file. The service generates an image with a photographic print with high restoration precision from this file. When an image is converted from a color space specific to a laboratory system to a standard color space of a personal computer, each pixel value is mapped after the conversion to the sum of the pixel value and a predetermined value, to produce and retain data containing image information of a range wider than the color reproduction range of the original image The data is output to a file together with reference values of the mapping, and the image can be restored in high precision by using this information upon printing.

10 Claims, 3 Drawing Sheets

METHOD AND APPARATUS FOR GENERATING A CONVERTED IMAGE WITH REDUCED QUALITY DEGRADATION RESULTING FROM THE CONVERSION

BACKGROUND OF THE INVENTION

1. Field of the Invention

The present invention relates to a method of and an apparatus for generating an image exchanged between a laboratory and a customer in a digital input output service for photographs such that an image having been output digitally at a laboratory and provided to a customer is later brought in to the laboratory again to be output as a print.

2. Description of the Related Art

A digital output service is known for recording image data read from a developed film or the like in a recording medium such as a CD-R, an MO disc, or the like, and for providing the recording medium to a customer. Also known is a digital input service in which a customer uses a personal computer to process image data that has been output by the digital output service and in which the customer brings the processed data to a laboratory to be reproduced as a photographic print.

A color space (a color coordinate system) for representing a digital image generally depends on equipment for handling the digital image. In other words, a system in a laboratory manages an image in a color coordinate system appropriate for dealing with the image to be output as a print. A personal computer manages an image in a color coordinate system such that the image can be displayed esthetically when displayed on a CRT. Therefore, using the above digital input output service, a conversion from a color space that is specific to a laboratory system (hereinafter called a specific color space) to a color space that is standard for a personal computer (hereinafter called a standard color space) is generally carried out when an image is output. Furthermore, when this image is input again into the system in the laboratory to be output as a print, a conversion from the standard color space to the specific color space is reversely carried out.

Since the values of pixels in an image are stored as data in a predetermined bit depth, the values that the pixels can take are restricted by the bit depth. For example, if 8-bit data are used, the values that the pixels can take are limited to integers from 0 to 255. However, the values which are obtained after the color space conversion on the digital image are not necessarily limited to the numbers in the same range, and adjustments such as a replacement of a negative value with 0 or a replacement of a number greater than 255 with 255 are carried out upon the conversion. It is therefore not guaranteed that an image which has once been converted to the standard color space will be restored completely after an inversion to the specific color space, and restoration errors may be created. This is one of the causes of print quality degradation.

SUMMARY OF THE INVENTION

Based on consideration of the above problems, an object of the present invention is to provide a method and an apparatus which generate an image retaining sufficient information for enabling reproduction in a laboratory with a high quality print.

An image generating method of the present invention converts an original image in a first color space to an image in a second color space, generates a converted image in a predetermined bit depth such that the original image is restored in the first color space when reverse processing to the original is carried out on the converted image, wherein the image generating method expands a value range that a pixel in the converted image can represent by setting the predetermined bit depth to a number larger than the bit depth of the original image; and generates a converted image retaining information on a pixel having a value after the conversion larger than a maximum value that the bit depth of the original image can represent and/or a negative value, by mapping each pixel value obtained by the conversion to a sum of each said pixel value and a predetermined value.

The "first color space" herein referred to means a color space specific to a system in a laboratory, and "the original image in the first color space" means digital image data obtained by a film scanner or the like in the laboratory.

Meanwhile, the "second color space" means a standard color space when an image is dealt with by a personal computer. The original image is converted to the "image in the second color space" and the "converted image in a predetermined bit depth" is generated. However, the bit depth upon the conversion processing (operation precision) is not necessarily limited to the predetermined bit depth. In other words, an image in the bit depth of the second color space is generated by the conversion and the image is recorded in the end in a recording medium or the like in the "predetermined bit depth".

The bit depth of an image means a bit depth assigned to each pixel value (in the case of a color image, R, G, and B of each pixel) composing the image, and this number determines the number of tones (precision) in the image. In other words, in an 8-bit image for example, each pixel takes a value which can be represented by 8 bits (from 0 to 255 for example), and the number of tones in this image is 256.

Therefore, "expands a value range which a pixel in the converted image can represent by setting the predetermined bit depth to a number larger than the bit depth of the original image" means the converted image is represented by 256 tones if both the original image and the converted image are 8 bit, while the converted image has 512 tones if the converted image is 9 bit for example, and the amount of information carried thereby can be doubled.

In the present invention, a color range represented by 256 tones in an original image is not represented in detail by 512 tones, but a color range wider than the one represented by the 256 tones is represented by the 512 tones. If the color spaces are different, color reproduction ranges are also different. Therefore, when color conversion is carried out, the image obtained after the conversion may not necessarily be in the same color range as of the original image.

For example, if white is represented by 0, it merely defines a color as white and assigns 0 to that color. Accordingly, in different color spaces, a color whiter than the color represented by 0 exists in some cases. Therefore, the present invention retains information regarding a pixel having a color whiter than the color represented by 0 (a color with a negative value) or a color darker than the color represented by 255 (a color with a value larger than 255) obtained after the conversion as it is, without approximating the information to 0 or 255.

As specific means for this, the image generating method of the present invention carries out mapping of pixel values as has been described above. For example, in the case where an 8-bit original image is converted to generate a 9-bit image, 128 is added to the pixel values after the conversion. Therefore, 0 is mapped to 128, and 256 is to 384. A negative value after the conversion can be retained as a value in a range from 0 to 127, and a value larger than 255 can be retained as a value from 384 to 511. In this manner, when an original image is restored from a converted image, an image with more fidelity than the original can be reproduced.

For easy understanding, the case where an original image is 8 bit and a converted image is 9 bit has been explained in the above. However, the method and an apparatus of the present invention do not limit the bit depth to these values.

An image generating apparatus of the present invention converts an original image in a first color space to an image in a second color space, generates a converted image in a predetermined bit depth such that the original image is restored in the first color space when an inverting processing of the conversion is carried out on the converted image, wherein the image generating apparatus comprises: bit depth setting means which expands a value range that a pixel in the converted image can represent by setting the predetermined bit depth to a number larger than the bit depth of the original image; and converted image generating means which generates a converted image retaining information on a pixel having a value after the conversion larger than a maximum value that the bit depth of the original image can represent and/or a negative value, by mapping each pixel value obtained by the conversion to a sum of each said pixel value and a predetermined value.

As a general method to improve restoration precision of an image, a method exists wherein a color range the same as that of an original image is represented in detail by increasing the bit depth. The present invention may be implemented in combination with such a method. For example, if an original image is 8 bit and a converted image is 10 bit, a color range the same as that of the original image is represented in detail with 9 bits (at a double precision), and the remaining 1 bit is assigned to representation of colors outside the original color range.

The image generating method and the apparatus of the present invention generate a converted image in a bit depth deeper than the bit depth of an original image, and map each pixel value to a sum of the pixel value and a predetermined number. Therefore, information regarding a pixel having a negative value and/or a value larger than a maximum value that the bit depth of the original image can represent, that is, information which would be lost if a converted image were generated in the same bit depth as of the original image, can be retained as it is. In this manner, by using this information upon restoring the original image, a restored image having higher precision can be obtained.

DESCRIPTION OF THE PREFERRED EMBODIMENT

Figure 1:
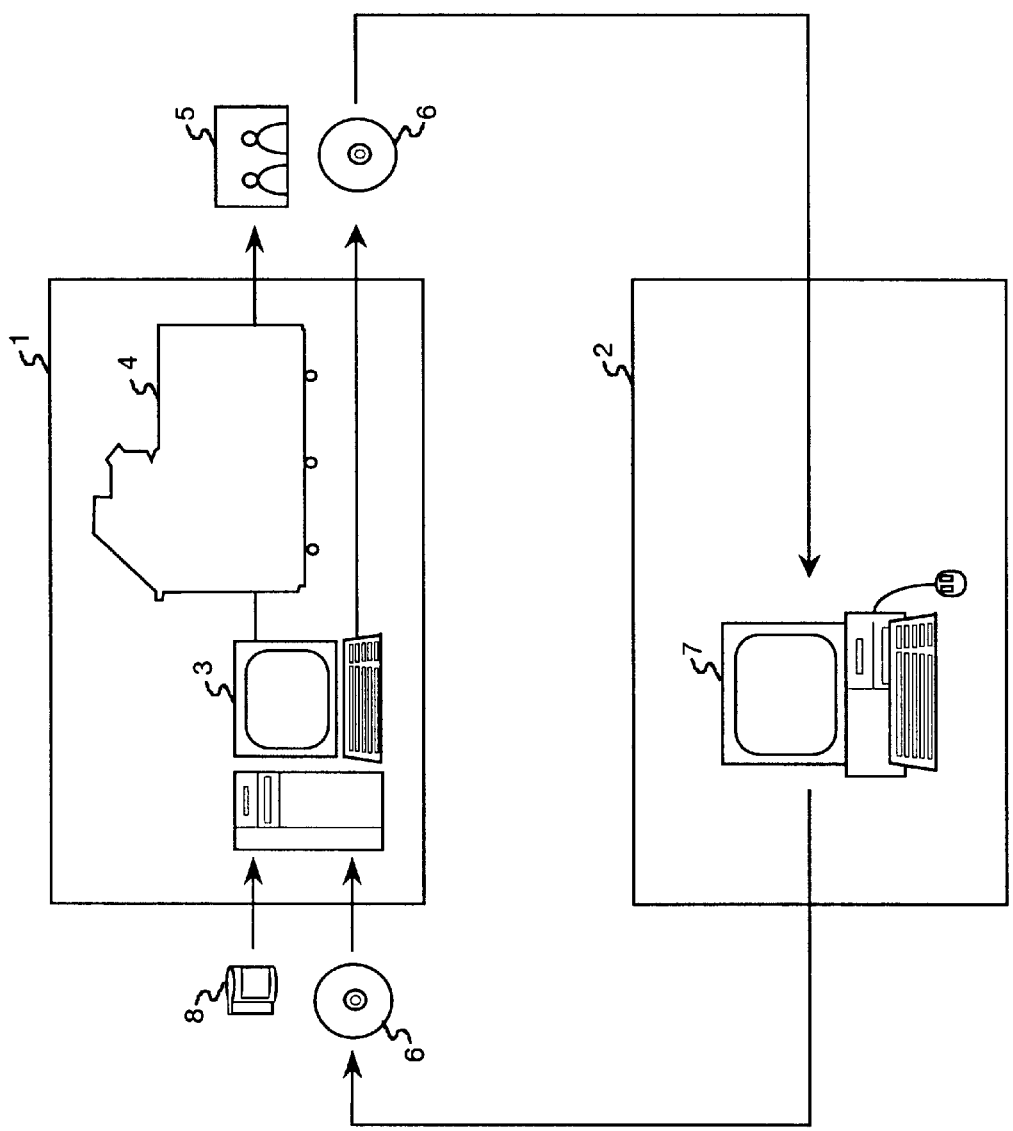
FIG. 1 is a diagram showing an outline of a digital input output service.

Hereinafter, an image generating method and an apparatus of the present invention will be explained with reference to the accompanying drawings. FIG. 1 is a diagram showing an outline of a digital input output service. An image handling apparatus 3 and a photographic printer 4 in FIG. 1 are installed in a laboratory 1, and a personal computer 7 is at a customer's home 2 or the like.

In this embodiment, the image handling apparatus 3 is a general purpose personal computer having dedicated software installed therein, and comprises a film scanner as peripheral equipment for reading a developed film. The image handling apparatus 3 has further installed a built-in or external medium drive for a CD-R or a Zip disc for example, and communications equipment (not shown) for exchanging an image with another computer via a network.

The photographic printer 4 is a known digital photographic printer. The printer 4 receives an image and output instructing information (for example, the quantity and the size of a print) from the image handling apparatus 3 and outputs a print based thereon.

In the above system, an image obtained from a film developed by the image handling apparatus 3 is converted from an image in a color space specific to the system appropriate for print output to an image in a standard color space appropriate for display on a CRT, and output as an image file to a recording medium 6 such as a CD-R.

The image file having been output in the recording medium can be used by the personal computer 7 of a customer. In other words, displaying the image recorded in the recording medium 6 on a CRT of the personal computer 7, a customer can generate ordering information by selecting an image to be printed or process the image by using retouch software available on the market.

The image file recorded in the recording medium 6 or the image file recorded in another recording medium after being processed on the personal computer can be output as a print 5 by being input to the image handling apparatus 3 in the laboratory again. The image file taken in at this time has an image in the standard color space. Therefore, a color conversion to the specific color space is carried out by the image handling apparatus 3.

The outline of the digital input output service has been explained. In such a service, an image generating method of the present invention is a method of generating an image to be output as a file based on a photographic image obtained from a film or the like, and its object is to generate an image from which a high quality photographic print can be generated in the same quality as in the case where the image obtained from the film is printed directly.

The above explanation is mainly regarding the image generating method of the present invention. An image generating apparatus of the present invention can be realized by installing a program for carrying out the processing which will be explained below in the image handling apparatus 3.

In an embodiment below, the bit depth which can retain sufficient image information is found for a color range the same as that of an original image, and a bit depth that is 1 deeper than the bit depth having been found is decided to be the bit depth of a converted image. In other words, by combining the method of the present invention with a method that represents a color reproduction range with higher precision by increasing the bit depth, precision of reproduction is improved.

Figure 2:
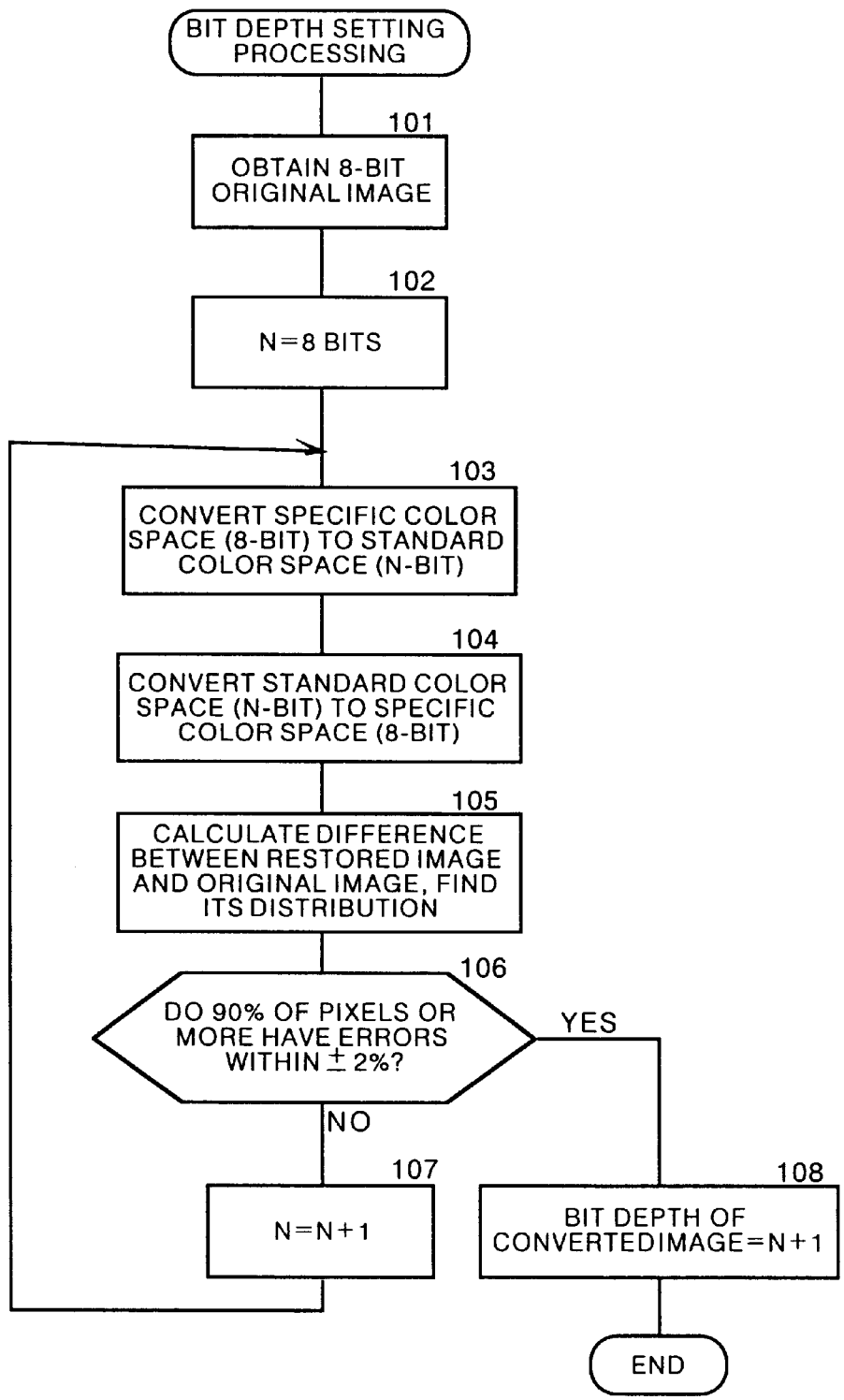
FIG. 2 is a flow chart showing a procedure of bit depth setting processing for a converted image.

A procedure for setting the bit depth of a converted image will be explained first. FIG. 2 is a flow chart showing this procedure. A developed film is read by the film scanner at a precision equal to or higher than 8 bits (10 bits, for example), and the image having been read is converted to a color space specific to the system (specific to a print) by predetermined set-up processing to obtain original images in R, G, and B (Step 101). Since R, G, and B are in the color space specific to the system, a conversion to a standard color space is necessary to output the original image in a recording medium so that the image can be used later by a personal computer or the like. In this embodiment, the bit depth N in the converted image is temporarily set (initialized) to 8 which is the same as that of the original image (Step 102).

In Step 103, the original image is converted from the specific color space to the standard color space. At this time, the bit depth N of the converted image is assumed to be 8, as has been set temporarily in Step 102. The converted image with 8 bits in the standard color space is then converted to an image in the specific color space to restore the original image (Step 104). In this embodiment, the conversion of the color space is carried out by a 3×3 matrix. However, a method for the color conversion is not limited to this, and a method wherein a 3 dimensional look-up table is used may also be adopted, for example.

In Step 105, differences between the pixel values corresponding to each other between the original image and the restored image in the specific color space are calculated, and distribution of the differences is found. In this embodiment, if 90% of the pixels or more have differences within ±2%, the restoration error is understood to be in an acceptable error range. Whether or not the distribution having been found satisfies this condition is judged in Step 106.

If the same bit depth as that of the original image is used, quantization error is generally large and restoration precision is not high. Therefore, it is assumed that the condition is not satisfied in Step 106. In this case, in Step 107, the bit depth N of the converted image is set to 9 from 8, and the processing from Steps 103 to 106 is repeated, using 9 as the bit depth of the converted image. Thereafter, the above processing is repeated while increasing the bit depth of the converted image by 1, until the condition is satisfied in Step 106.

If 90% or more pixels have the errors within ±2% as a result of the bit depth increase in the converted image, a bit depth deeper by 1 than the bit depth is set to be the bit depth of the converted image (Step 108).

Figure 3:
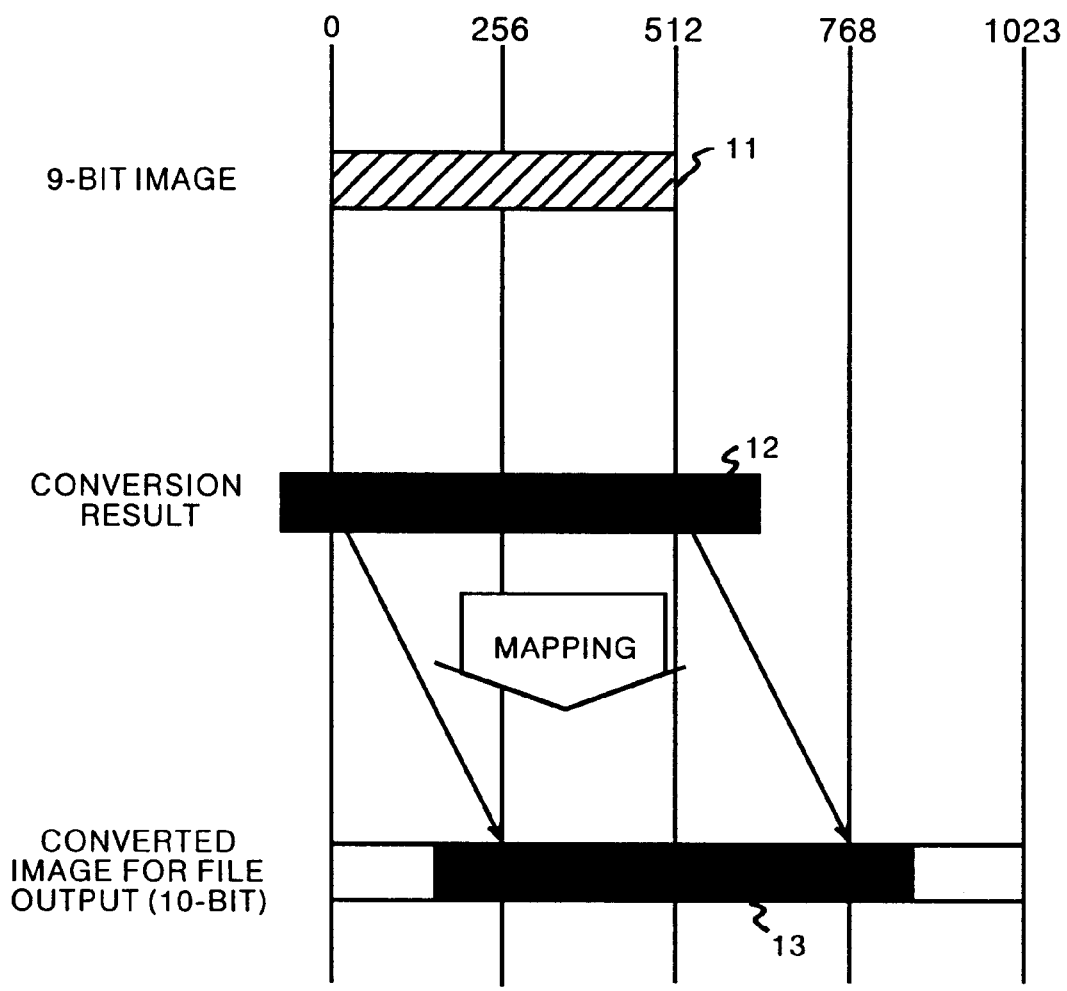
FIG. 3 is a diagram for explaining an image generating method of the present invention.

Pixel value mapping processing will be explained next. FIG. 3 is a diagram showing value ranges that each pixel composing an image can take. 0, 256, 512, 768, and 1023 are the scale of the pixel value ranges. For example, a range 11 shows that each pixel can take a value in a range from 0 to 511 if an image is recorded with 9 bits.

In the flow chart in FIG. 2, assume that the condition at Step 106 is met when the bit depth N is 9. In this case, in Step 108, the bit depth in a converted image is set to 10 which is the sum of 9 and 1.

When a converted image is generated with 9 bits, the value each pixel can take is from 0 to 511. However, when a color space conversion is carried out, as has been described above, the value after the conversion can be negative or larger than 511, as shown by a range 12 in FIG. 3.

On the other hand, in this embodiment, a pixel value mapping is carried out such that 0 is mapped to 256 and 512 to 768, and a converted image is generated as a 10-bit image. As shown by a range 13 in FIG. 3, a pixel can take a value from 0 to 1023 in 10 bits. Therefore, if the range 12 is mapped to the range 13, no portion of the image information will be lost as a result of the conversion.

In this method, information regarding the bit depth in the converted image and the values used as references upon the mapping (256 and 512 in the example in FIG. 3) is saved together with the image in an output image file. When a photographic print is generated based on this file, the original image is restored by conversion from the standard color space to the specific color space with reference to the above information.

As has been described above, the method of the present invention can improve restoration precision upon restoring an image for printing from a file, and contributes greatly to the spread of digital photographic services.

What is claimed is:

1. An image generating method which converts an original image in a first color space to a converted image in a second color space having a predetermined bit depth such that the original image is restored in the first color space when an inverting processing of the conversion is carried out on the converted image, wherein the image generating method comprises:

expanding a value range that pixels of converted images can represent by setting the predetermined bit depth to a number larger than the bit depth of the original image; and generating converted image retaining information on a pixel having a value after the conversion larger than a maximum value so that the bit depth of the original image can represent a positive and/or a negative value, by mapping each pixel value obtained by the conversion to a sum of each said pixel value and a predetermined value.

2. The image generating method of claim 1, further comprising:

identifying a number of bits necessary to accurately represent the converted image.

3. The image generating method of claim 2, further comprising:

converting pixels within an image to a color space defined by the identified number of bits.

4. The image generating method of claim 2, wherein the identifying comprises:

comparing original pixels to converted pixels to determine an error therebetween, comparing the error to a predetermined threshold, adding an additional bit to a number of bits defining a range that satisfies an error requirement, and ultimately shifting pixel values uniformly such that the lowermost color value is greater than the lowest value in the range and the uppermost color value is less than the uppermost limit of the range.

5. The image generating method of claim 1, wherein the expanding the value range that pixels of converted images can represent is performed by expanding both the value range and resulting power.

6. An image generating apparatus which converts an original image in a first color space to an image in a second color space, and which generates a converted image in a predetermined bit depth such that the original image is restored in the first color space when an inverting processing of the conversion is carried out on the converted image, the image generating apparatus comprising:

bit depth setting means which expands a value range that pixels of converted images can represent by setting the predetermined bit depth to a number larger than the bit depth of the original image; and converted image generating means which generates a converted image retaining information on a pixel having a value after the conversion larger than a maximum value so that the bit depth of the original image can represent a positive and/or a negative value, by mapping each pixel value obtained by the conversion to a sum of each said pixel value and a predetermined value.

7. The image generating apparatus of claim 6, further comprising:

an identifier that identifies a number of bits necessary to accurately represent the converted image.

8. The image generating apparatus of claim 7, further comprising:

a converter that converts pixels within an image to a color space defined by the identified number of bits.

9. The image generating apparatus of claim 7, wherein the identifier comprises:

a comparor that compares original pixels to converted pixels to determine an error therebetween, a comparor that compares the error to a predetermined threshold, an adder that adds an additional bit to a number of bits defining a range that satisfies an error requirement, and a shifter that ultimately shifts pixel values uniformly such that the lowermost color value is greater than the lowest value in the range and the uppermost color value is less than the uppermost limit of the range.

10. The image generating apparatus of claim 6, wherein the bit depth setting means expands the value range that pixels of converted images can represent is performed by expanding both the value range and resulting power.

* * * * *